Dec. 4, 1951  A. N. IKNAYAN ET AL  2,576,940
APPARATUS FOR SPLICING RUBBER ARTICLES
Filed Sept. 14, 1949  7 Sheets-Sheet 3

INVENTOR.
ALFRED N. IKNAYAN
ALFRED B. CLAYTON
BY Henry P. Truesdell
ATTORNEY.

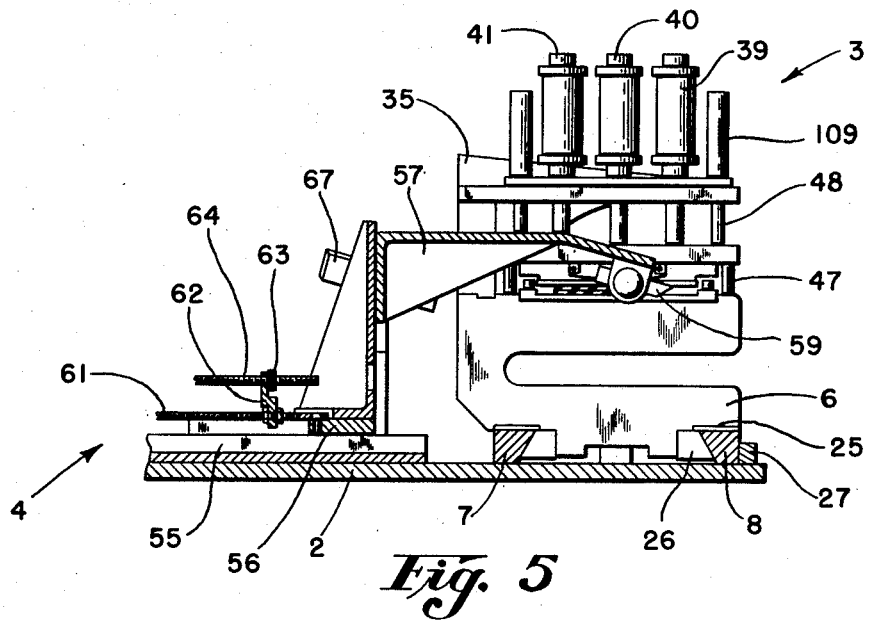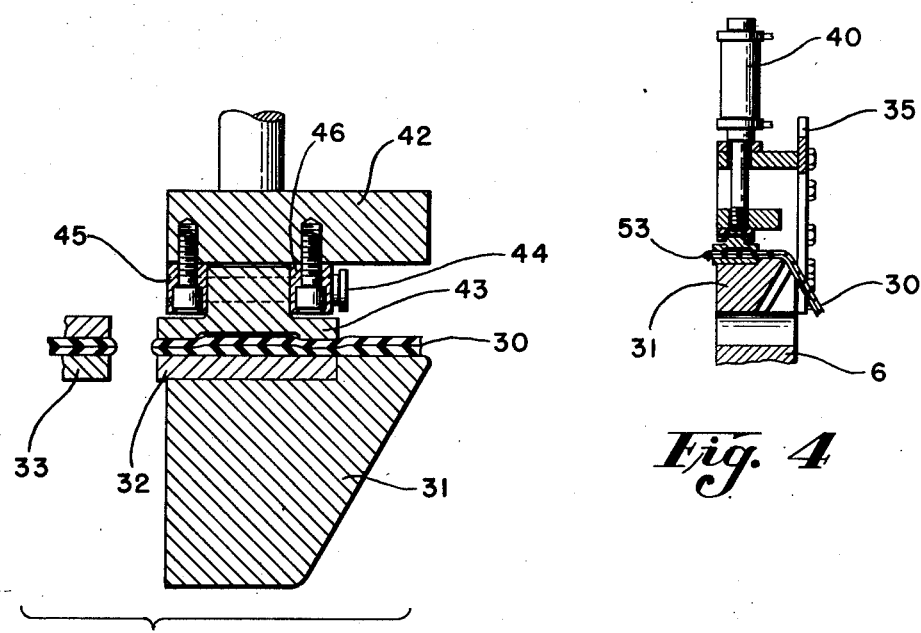

Dec. 4, 1951  A. N. IKNAYAN ET AL  2,576,940
APPARATUS FOR SPLICING RUBBER ARTICLES
Filed Sept. 14, 1949  7 Sheets-Sheet 5

INVENTOR.
ALFRED N. IKNAYAN
ALFRED B. CLAYTON
BY Henry P. Truesdell
ATTORNEY.

INVENTOR.
ALFRED N. IKNAYAN
ALFRED B. CLAYTON
BY
Henry P. Truesdell
ATTORNEY.

INVENTOR.
ALFRED N. IKNAYAN
ALFRED B. CLAYTON
BY
Henry P. Truesdell
ATTORNEY.

Patented Dec. 4, 1951

2,576,940

UNITED STATES PATENT OFFICE 2,576,940

APPARATUS FOR SPLICING RUBBER ARTICLES

Alfred N. Iknayan and Alfred B. Clayton, Indianapolis, Ind., assignors to United States Rubber Company, New York, N. Y., a corporation of New Jersey Application September 14, 1949, Serial No. 115,658

17 Claims. (Cl. 154—9)

This invention relates to an apparatus for splicing rubber articles and, in particular, it relates to an apparatus for butt splicing inner tubes for pneumatic tires. More particularly, the invention relates to an apparatus for butt splicing inner tubes according to a butt splicing method disclosed in our United States Patent No. 2,550,566, assigned to the same assignee as the instant application.

The present apparatus provides a machine upon which a rubber article or inner tube in strip form is positioned. Once this operation is manually accomplished, the apparatus automatically completes a cycle of operation which results in a completely spliced inner tube. The cycle of operation includes gripping each end of the inner tube and cutting excess stock from the inner tube close to the gripping means. Thereafter additional pressure is exerted on the gripping means so as to cause the cut edges of the rubber stock to be squeezed outwardly. When this occurs, the gripping means move together so that the opposite ends of the tube are brought together in butt spliced relationship.

In accomplishing this operation, the excess rubber stock at the ends of the tube is cut close to the clamping means. As a result of this cut and the subsequent squeezing of the inner tube in the clamping means, the inner tube when brought together in butt spliced relationship leaves little or no flash or rind at the junction of the splice.

To produce effectively a butt spliced inner tube with no flash requires a precision operated machine. The present invention provides such a machine capable of effectively joining inner tubes together so that the line of demarcation at the junction of the tube is almost obliterated and the ends of the tube homogeneously united.

It is therefore among the objects and advantages of our invention to provide a machine for splicing inner tubes which will function automatically throughout its cycle of operation; to provide a butt splicing machine which utilizes hot knives for trimming the free ends of the tube and including novel means for maintaining the knives in a heated state; and to provide such a machine which is efficient in operation and economical of manufacture. These and other objects and advantages will appear more fully in the following detailed description when considered in connection with the accompanying drawings, in which:

Figure 4 is a front view, in section, of an inner tube clamping jaw, the section being taken along lines IV—IV on Figure 1;

Figure 5 is a side view of a portion of the apparatus, in section, illustrating the cutting mechanism, the section being taken along lines V—V of Figure 1;

Figure 6 is an enlarged view, in section, of a clamping jaw, the view being similar in part to that illustrated in Figure 4;

Figure 1:
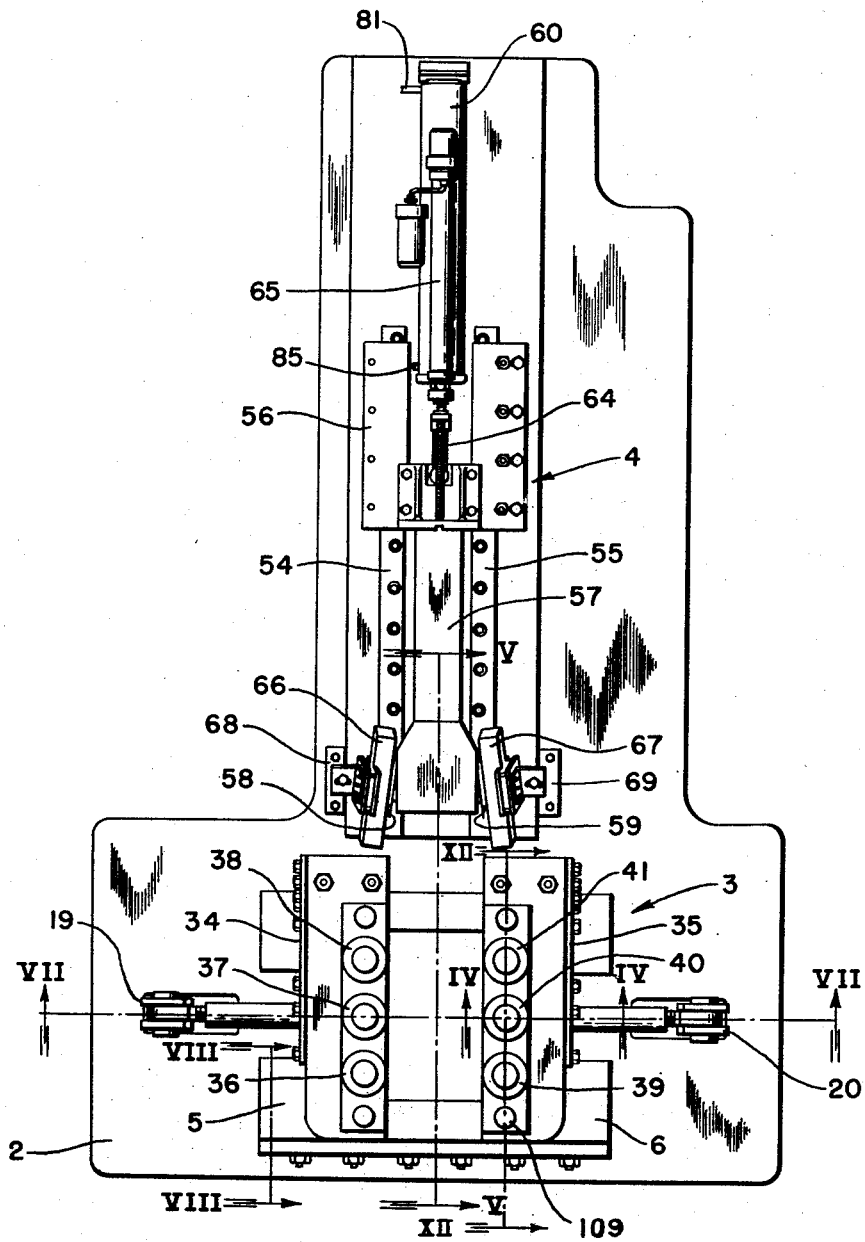
Figure 1 is a plan view of a butt splicing machine forming an embodiment of our invention.
Figure 2:
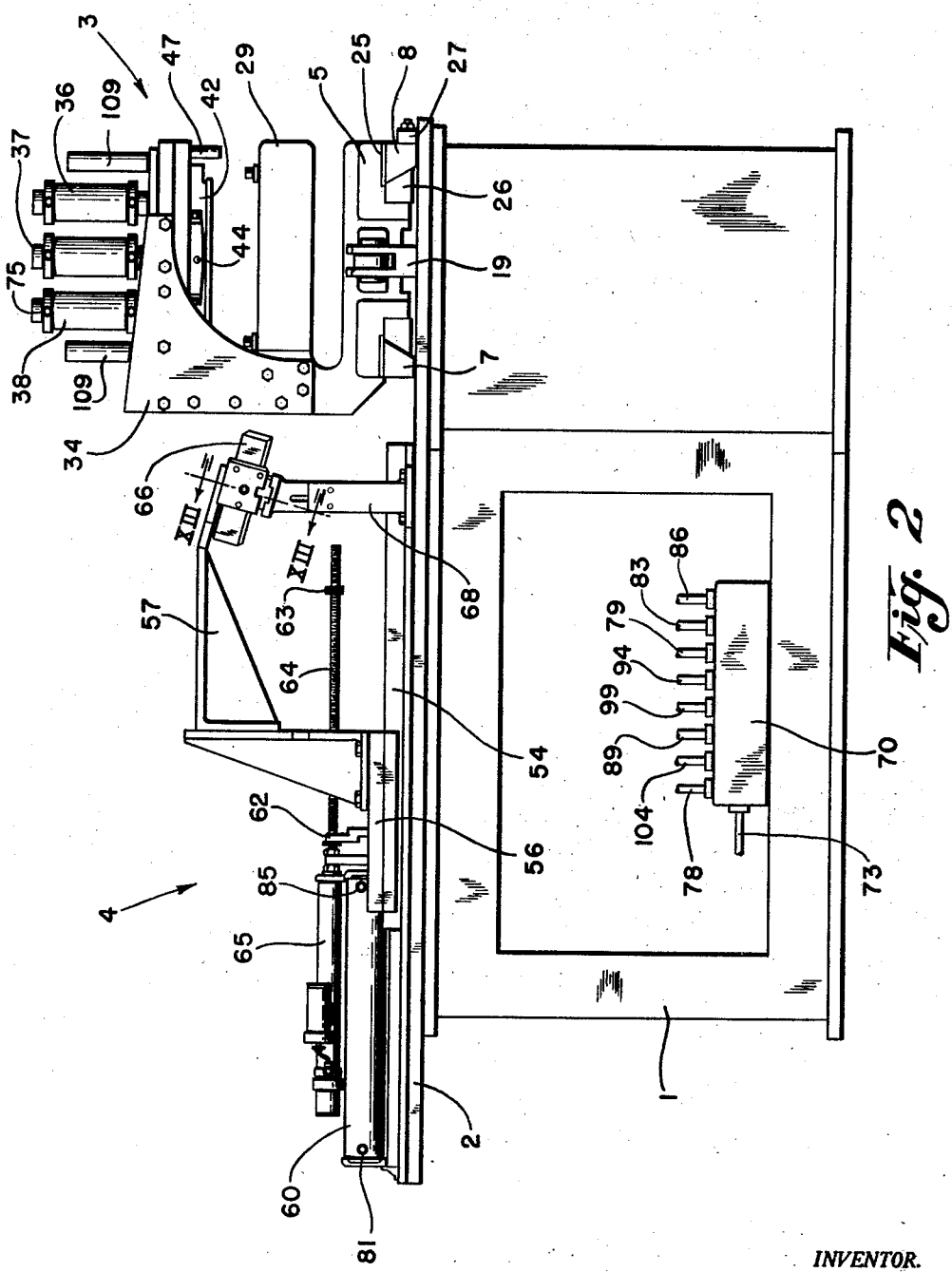
Figure 2 is a side elevational view thereof.
Figure 3:
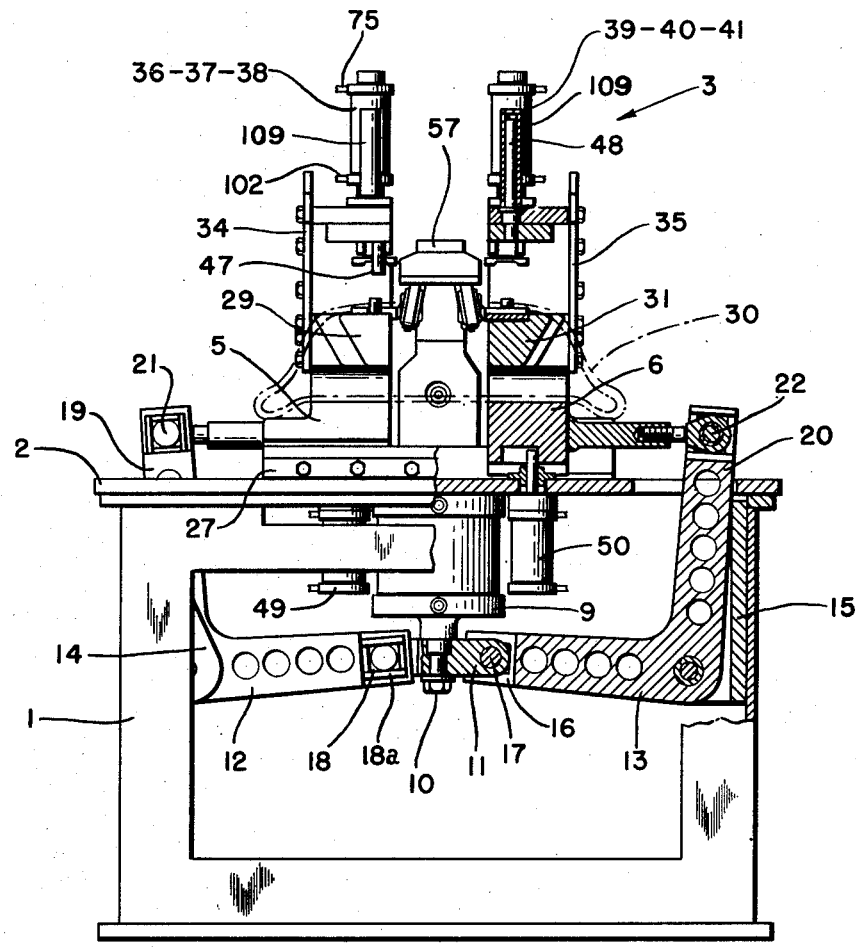
Figure 3 is an end elevational view thereof, partly in section.

With reference to the drawings and, in particular, to Figures 1 and 2, we show an embodiment of our invention in the form of an inner tube butt splicing machine. The machine is supported by a frame 1 upon which is mounted a table top 2. Essentially, the apparatus is divided into two assemblies, one of which is a clamping unit 3 and the other a cutting unit 4.

Figure 7:
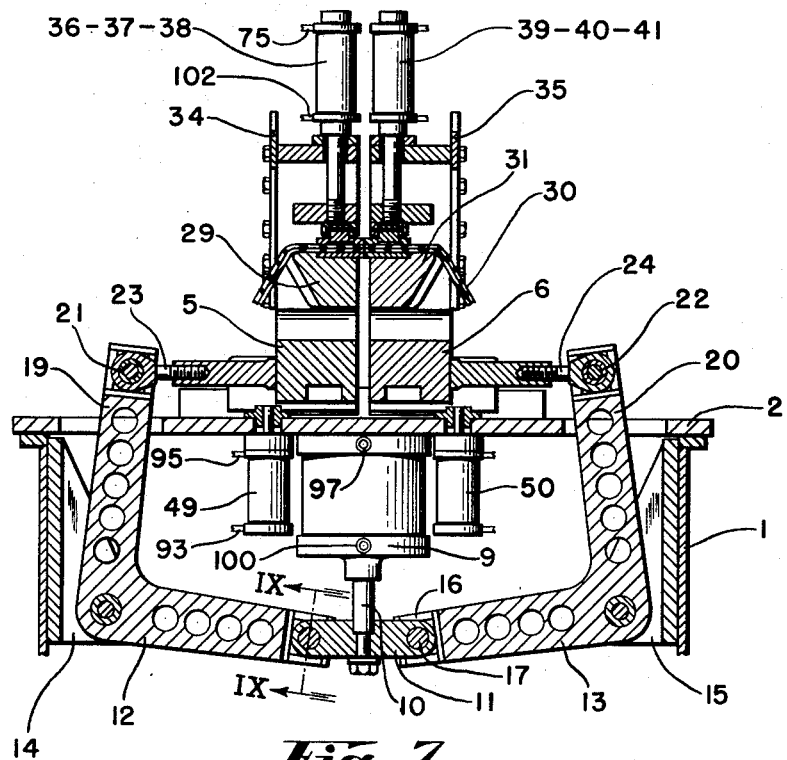
Figure 7 is a transverse view, in section of the inner tube clamping means, the section being taken along lines VII—VII of Figure 1.

A pair of carriages 5 and 6 (Figure 7) are slidably mounted on a pair of tracks 7 and 8 (Figure 2). These carriages 5 and 6 are slidable along the tracks 7 and 8 by means of their connection with a fluid operable cylinder 9 (Figure 7). The cylinder 9 is located centrally of the carriages 5 and 6 and is fastened below the table top 2. A piston rod 10 associated with the cylinder 9 connects with a cross link 11 which in turn is pivotally connected to a pair of bell cranks 12 and 13. Brackets 14 and 15 attached to the frame 1 provide means for pivotally supporting the bell cranks 12 and 13, respectively.

Figure 9:
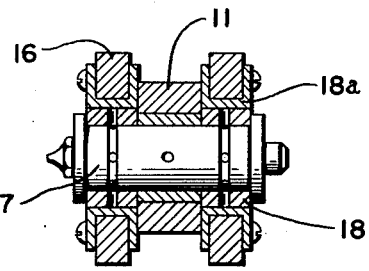
Figure 9 is a transverse view, in section, of a connecting joint taken along lines IX—IX of Figure 7.

As shown more particularly in Figure 9, the link 11 joins with the bell crank, such as 12, through a bifurcated arm 13 forming a part of the ball crank. A pin 17 joins the link 11 with a slide block 18 which engages a track member 18a attached to the bifurcated arm. The purpose of this combination pivotal and slidable joint is to provide a smooth action in converting the axial movement of the piston rod 10 into a radial movement as required by the ends of the bell cranks 12 and 13.

The adjoining arms 19 and 20 of the bell cranks 12 and 13, respectively, are also provided with pivotal and slidable connections 21 and 22, respectively. A connecting rod 23 forms an attachment between the joint 21 and the carriage 5. Similarly, a connecting rod 24 forms a means of connecting the carriage 6 with the joint 22. As thus described, operation of the cylinder 9 causes the carriages 5 and 6 to move toward or away from each other while being supported on the tracks 7 and 8.

Since the carriages 5 and 6 are identical except for being in right and left hand position, mainly only one of the carriages, 5, is described in detail for purposes of simplicity.

Figure 8:
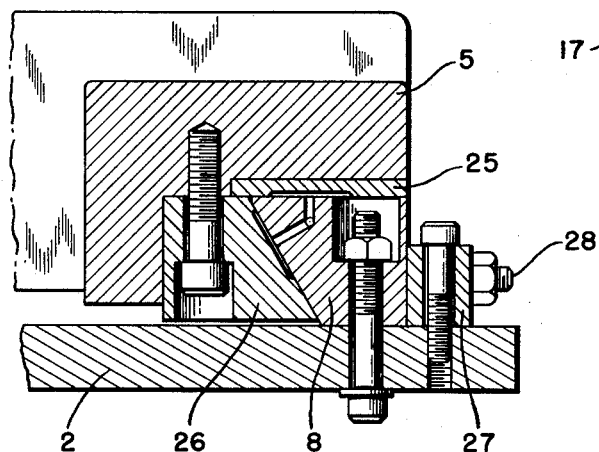
Figure 8 is a detailed view, in section, taken along lines VIII—VIII of Figure 1.

As shown in Figure 8, the carriage 5 has attached thereto a horizontal track slide 25 and a lateral track slide 26. The track 8 itself is fastened to the table top 2. A rail 27 also attached to the table top 2 is positioned alongside of the track 8 and a bolt 28 joining the rail 27 with the track 8 provides means for adjusting the position of the track 8 to permit a smooth sliding action of the carriage thereon.

The carriage also supports an anvil-like member 29 (Figure 7) which provides the main support and clamping means for an inner tube 30 which is mounted thereon. A similar anvil 31 is associated with the carriage 6. As shown in Figure 6, the anvil 31 includes an insert 32 which serves as a means against which the inner tube 30 is gripped. This insert projects slightly beyond the vertical edge of the anvil. A similar insert 33 is associated with the anvil 29.

The carriages 5 and 6 have extending therefrom brackets 34 and 35, respectively, for supporting air cylinders which function to clamp the inner tube 30 against the anvils 29 and 31. These air cylinders 36, 37 and 38 are associated with the bracket 34, and air cylinders 39, 40 and 41 are associated with the bracket 35. The reason that three air cylinders are used in parallel operation is merely to obtain desired pressure on the tube, in combination with the use of a small size cylinder thus permitting the cylinders on the carriages 5 and 6 to be located closer together.

Connected to the piston rods extending from the cylinders 39, 40 and 41 is a plate 42 (Figure 6) to which is attached an inner tube clamping bracket 43. This clamping bracket 43, by means of a pin 44, is pivotally connected to a pair of bars 45 and 46 which, in turn, are bolted to the plate 42. The purpose of this connection is to permit the clamping bracket 43 to adjust itself for applying a uniform pressure against the surface of the inner tube 30. A similar clamping arrangement is provided in connection with the carriage 5 for association with the air cylinders 36, 37 and 38.

In clamping the tube 30 against the anvils 29 and 31, it is desirable to first apply a high pressure followed by a reduced pressure after which the cut is made. Due to the flow characteristics of the unvulcanized rubber of the tube, the high pressure clamping operation followed by the lower pressure results in a more static condition in which the rubber remains at rest while the cut is being made. The purpose of the dual variation in pressure is to provide a more accurate cut because it is an advantage of the invention to provide a machine which will effect a cut through the smallest possible area of the tube, thus resulting in a better splice. In order to obtain this differential pressure, the initial downward clamping pressure of the cylinders 36 to 41 is approximately 80 pounds per square inch. This pressure is sustained for a period of about one second, after which a counter-pressure of 60 pounds is introduced into the bottom of the cylinders. The net residual downward thrust which clamps the inner tube is about 20 pounds pressure per square inch.

Figure 12:
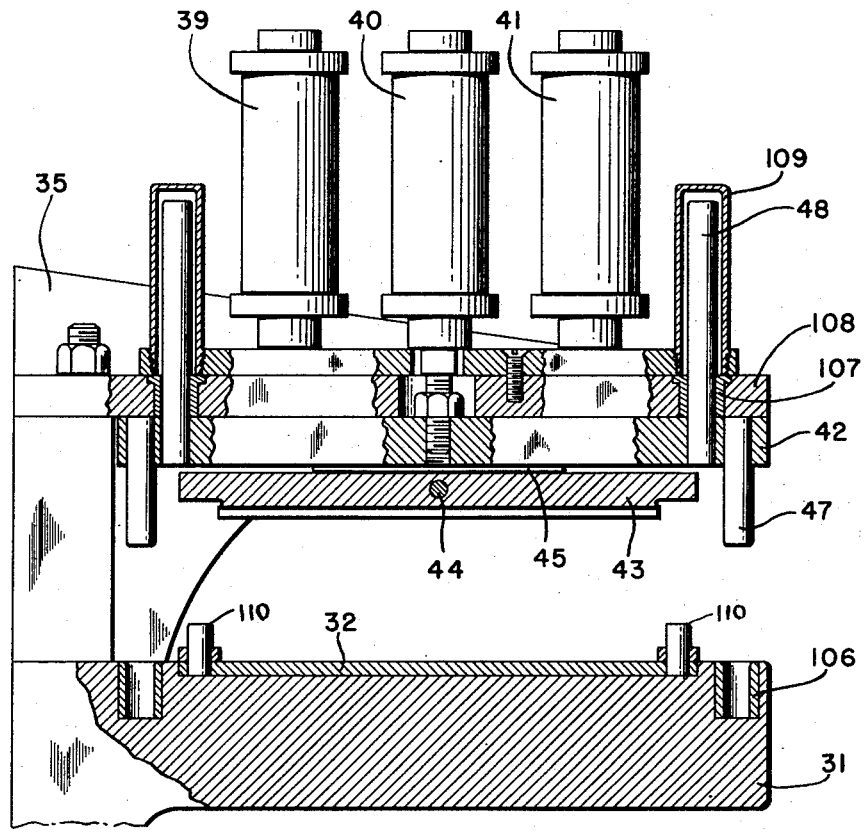
Figure 12 is an enlarged view, partly in section, illustrating the dowel alignment arrangement of the clamping jaws, the section being taken along lines XII—XII of Figure 1.

As shown in Figure 12, dowels 47 pressed into the plate 42 extend downward and engage with an aperture in a bushing 106 in the anvil 31 for maintaining the clamping bracket 43 in proper registry with the clamping insert 32 of the anvil 31. Also, guide pins 48 pressed into the plate 42 extend upward and are slidable in a bushing 107 pressed in a plate 108 attached to the bracket 35. These guide pins 48 assist in maintaining the plate 42 in proper alignment with the cylinders 39, 40 and 41. Enclosing the projecting portion of each guide pin 48 is a sleeve or cover 109 which serves as a safety device for the operator. A similar set of dowels and guide pins are associated with the opposite half of the clamping device actuated by cylinders 36, 37 and 38. Pins 110 projecting upwardly from the insert 32 serve as a stop against the upper clamping bracket 43.

Figure 11:
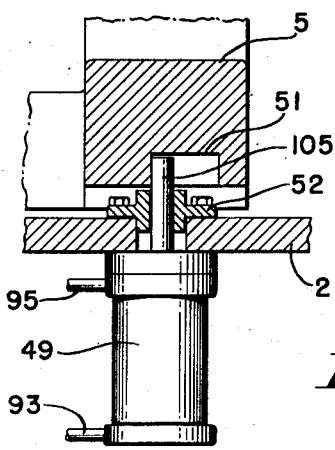
Figure 11 is an enlarged view, partly in section, of a cylinder operated locking mechanism.

In order to maintain the carriages 5 and 6 in proper position for a cutting operation hereinafter described, it is necessary that the carriages be locked during the cutting operation. This is accomplished by means of a pair of air cylinders 49 and 50 attached to the underside of the table top 2. The air cylinder 49, shown in particular in Figure 11, includes a piston rod 105 which serves as a latch for projecting into a slot 51 in the carriage 5. A hub 52 attached to the top of the table 2 serves as a guide for the piston rod latch 105. The latch formed by the piston rod limits the inward movement of the carriages 5 and 6 during the cutting operation. A similar latch arrangement is associated with the air cylinder 50 and the carriage 6.

When an inner tube is clamped in position against the anvils 29 and 31, it is necessary to trim off the projecting end 53 (Figure 4) of the inner tube 30. This cutting operation is accomplished by means of a mechanism shown in particular in Figures 1 and 2. Attached to the top of the table 2 is a pair of tracks 54 and 55 on which is slidable a carriage 56. This carriage includes an overhanging bracket 57 to which is attached a pair of knife blades 58 and 59. The knife blades are so located that upon forward movement of the carriage 56, the blades are pressed close against the inner tube insert members 32 and 33 (Figure 6) so as to cut the overhanging portion 53 of the inner tube flush with the surface of the members 32 and 33.

In order to move the carriage 56 into cutting position, an air cylinder 60 is provided. The connection between the cylinder 60 and the carriage 56 is made by means of a piston rod 61 (Figure 5) which is threaded and which includes a lug 62 adjustably attached to the rod 61. While it is desirable to advance the knife blades 58 and 59 rapidly toward and away from cutting position, it is also desirable that the cut itself should be made at a relatively slow rate. To accomplish this, the lug 62, when the cutting knives reach the cutting position, engages with an adjustable threaded nut 63 threaded onto a piston rod 64 extending from a hydraulic check cylinder 65. Check cylinder 65 is of a conventional construction now available on the market, for example a Bellows Hydro-Check. As a result of this arrangement, the cylinder 60 moves the carriage rapidly until the knives are about to cut the inner tube. At this point, the check cylinder 65 slows down the movement of the carriage so that the knives make a slow and uniform cut. When the cut is completed, the cylinder 60 causes a rapid return of the carriage without the restricting influence of the hydraulic check cylinder 65.

In order to provide a more effective cut of the rubber inner tube, it is desirable that the knives 58 and 59 should be hot. To heat these knife blades, a pair of electrically heating elements or blocks 66 and 67 is provided, the elements being supported in a stationary position by means of brackets 68 and 69, respectively, attached to the top of the table 2. These electrically heated blocks 66 and 67 are constantly energized and are so positioned that each time the carriage 56 moves to its receded position, the knives 58 and 59 rest firmly against the electrically heated blocks 66 and 67, respectively. By this arrangement, heat is transferred from the electrically heated elements to the knife blades to maintain the blades at all times at the proper temperature.

Figure 13:
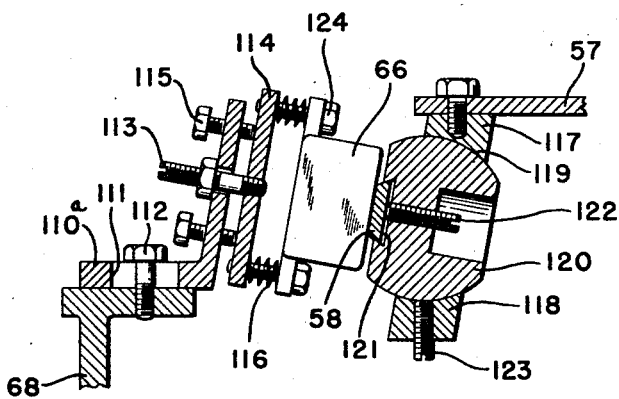
Figure 13 is a transverse view, in section, of a knife and heater holding means taken along lines XIII—XIII of Figure 2.

It is desirable that the knife blades 58 and 59 rest firmly against the heated blocks 66 and 67, respectively, in order that heat may be conducted readily from the heating elements to the knife blades. Figure 13 illustrates a method of supporting the heating elements and the knife blades. On the supporting bracket 68 is an angle member 110a having a slot 111 thereon and attached to the bracket 68 by means of a machine screw 112. This permits transverse adjustment of the angle member 110a relative to the bracket 68. Attached to the angle member 110a by means of a bolt 113 is a plate 114 adapted to be positioned in an adjustable manner by means of adjusting screws 115. The plate 114, in turn, supports the heating element 66 by means of bolts 124, compression springs 116 interposed between the plate 114 and the heating element 66 and carried by bolts 124 provide a resilient mounting for the heating element.

The knife blade 58 is supported from the overhanging bracket 57 by means of a pair of clamping brackets 117 and 118 bolted to the bracket 57. The brackets 117 and 118 include a spherical aperture 119 into which is positioned a spherical member 120 having an undercut slot 121 thereon for the purpose of retaining the knife blade 58. A set screw 122 extending through the spherical member 120 exerts a pressure against the knife blade 58 for the purpose of holding the blade securely in the slot 121. The purpose of the spherical member 120 is to allow adjustment of the member so that the knife blade 58 will lie parallel and adjacent to the surface of the new heating element 66. When in this position, a set screw 123 extending through the clamping bracket 118 may be tightened for holding the spherical member 120 in a fixed position. While the foregoing description relates to the supports for the heating unit 66 and the knife blade 58, it is to be understood that a similar arrangement is utilized to support the heating unit 67 and the knife blade 59.

*Operation*

Figure 10:
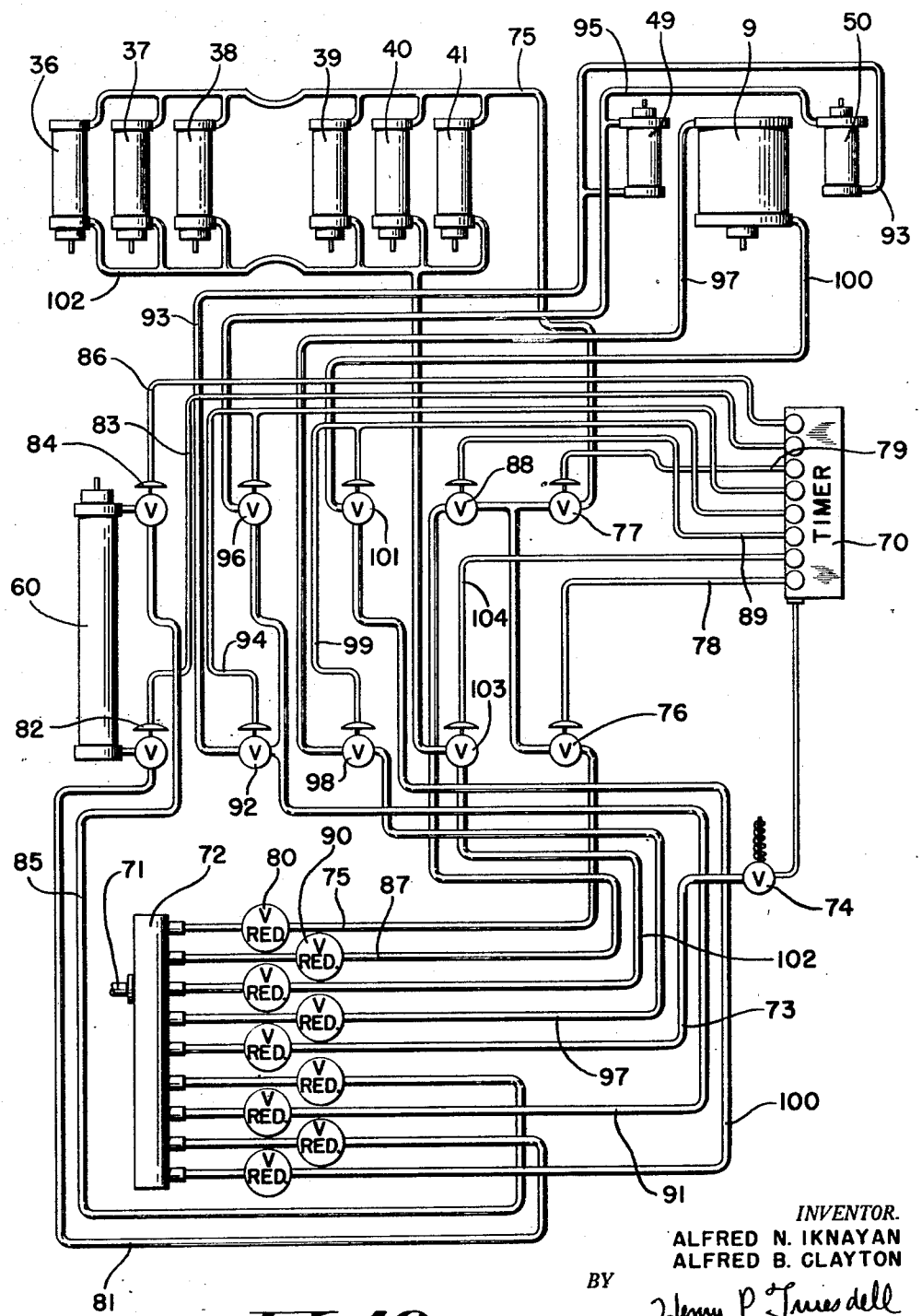
Figure 10 is a piping diagram illustrating the manner of controlling the operation of the apparatus.

The present apparatus is actuated by fluid pressure means. The time cycle of operation is controlled by a timer 70 (Figure 10). This timer is a conventional device referred to as a drum type controller. It includes cams for operating pneumatic valves which in turn provides a medium through fluid pressure for operating pneumatic diaphragm type valves hereinafter described. The timer is driven by a synchronous motor. This type of timer is more particularly described in a patent to Southerland, No. 2,438,724, of March 30, 1948 and itself forms no part of the present invention.

The main air supply for operation of the apparatus enters the system through a conduit 71 leading from a source of air pressure. The conduit 71 connects with a header or manifold 72 from which separate conduits extend to the various air cylinders. One conduit 73 leading from the header 72 connects to the timer 70 to form a source of pressure for the operating valves to be hereinafter described. Along the conduit 73 is a valve 74 which is a conventional electrically operated solenoid valve so that it may be controlled by a push button accessible to the operator. Operation of the valve 74 functions to start or stop the apparatus.

When an inner tube is positioned by the operator in proper location on the apparatus, the operator initiates the cycle by opening the valve 74 and pressing a push button, not shown, which starts the synchronous motor of the timer. The first operation is the actuation of the cylinders 36 to 41, inclusive, which provides clamping pressure against the inner tube 30 through the aforementioned plate 42 and clamping bracket 43. This is accomplished by means of the conduit 75 which connects with the header 72 and with the top of each of the cylinders 36 to 41. Along this conduit are two pneumatically operated valves 76 and 77. These valves, in turn, are connected to the timer 70 by means of conduits 78 and 79, respectively. The timer then operates to open both valves 76 and 77 allowing pressure to pass from the header to the top of cylinders 36 to 41. At the same time, the timer operates through a control pressure line 104 to close a valve 103 and shut off the pressure from the header to the bottom of cylinders 36 to 41 supplied through a line 102. This applies maximum pressure to the rubber of the inner tube which, as already mentioned, may be of the order of 80 pounds per square inch. After a short time interval which, as previously described, is approximately one second, the pressure applied to the rubber is reduced during the cutting operation. To accomplish this the timer then opens valve 103 to allow fluid pressure to pass from the header to the bottom of cylinders 36 to 41. The pressure through valves 76 and 77 being greater than the pressure through valve 103 the net resulting pressure applied by the cylinders allows the inner tube 30 to be held or squeezed in position for the cutting operation at reduced pressure of approximately 20 pounds per square inch. Reducing valves such as 80 regulate the desired pressures.

The next step in the operation is to cut the ends of the inner tube. This is accomplished by advancing the piston in the cylinder 60. A conduit 81 leads from the cylinder 60 to the header 72. A pneumatically operable valve 82 in the line 81 is operable through a conduit 83 leading to the timer 70. After this cut is made according to the timer cycle, the valve 82 is closed and a pneumatically operated valve 84 at the opposite end of the cylinder is opened so as to retract the piston in the cylinder 60. The valve 84 is connected to a conduit 85 leading to the header 72. Also, this valve 84 is operated from the timer by means of fluid pressure in a conduit 86.

After the ends of the inner tube have been cut and the knife blades returned to their normal inoperative position, additional force is applied to the cylinders 36 to 41 so as to squeeze the rubber of the inner tube slightly out from its clamping jaws, as shown in Figure 6. It is to be remembered that the knives cut the inner tube flush with the face of the clamping members 32 and 33 and that additional pressure thereafter applied causes the rubber to bulge out. When these bulging portions of the rubber stock are brought together, the splice is produced.

In order to provide the additional pressure against the inner tube, a second system of valves is operated to cause this additional pressure. A conduit 87 connects the header 72 with the conduit 75 at a point between valves 76 and 77. A pneumatically operated valve 88 in line 87 is operated from the timer 70 by means of a conduit 89. The timer now operates to maintain valve 77 in its open position and, at the same time, closing valve 76 and opening valve 88. This provides increased air pressure for squeezing the rubber stock between the clamping jaws. A reducing valve 90 in the line 87 controls the differential pressure between lines 75 and 87. As illustrated in Figure 10, each of the conduits leading from the header 72 is provided with a reducing valve similar to 80 and 90 so that the proper pressure may be distributed to its connecting cylinder.

While the high pressure is still retained in cylinders 36 to 41 so as to clamp the inner tube, the two ends are brought together in butt splice relationship by means of actuation of the cylinder 9.

Before the cutting operation takes place, it is desirable to hold and lock the carriages 5 and 6 in cutting position so as to be in proper alignment with the cutting knives. This locking arrangement is provided by means of the cylinders 49 and 50, each of which are connected to the header 72 by means of a conduit 91. This conduit 91 leads to a pneumatically operated valve 92 and thence to a conduit 93 joining the lower ends of the cylinders 49 and 50. The valve 92 connects to the timer through the conduit 94. The opposite ends of the cylinders 49 and 50 are connected with a conduit 95 and to a valve 96 joining with the conduit 91. The valve 96 also connects with the conduit 94 leading to the timer. In operation, the valve 92 is opened so that the latches 105 extending from the cylinders 49 and 50 engage with the carriages 5 and 6 to lock them in position for cutting. It is to be understood that during this period there is pressure in the cylinder 9 to hold the carriages 5 and 6 tightly against the latches 105. At the same time, the valve 96 is opened. As soon as the cut is completed, the timer reverses this condition; that is, valve 92 closes, valve 96 opens, and the latches extending from cylinders 49 and 50 are retracted to permit advancement of the carriages 5 and 6.

In order to advance the carriages to complete the splicing operation, fluid is introduced into the cylinder 9 through a conduit 97 leading to the header 72. A valve 98 in the line 97 is actuated by pressure in a conduit 99 leading to the timer 70. When the splice is completed, the cylinder 9 is again actuated so as to separate the carriages 5 and 6. This is accomplished through a conduit 100 leading from the cylinder 9 to the header 72. A pneumatically operated valve 101 in the line 100 is connected to the timer 70 by means of the conduit 99. In this operation, the valve 98 is open and the valve 101 is simultaneously closed during the advancement of the carriages 5 and 6. To separate the carriages, valve 101 is opened and valve 98 is simultaneously closed.

Before the carriages recede to their original outward positions, the inner tube clamping jaws are released. To cause this release, a conduit 102 leads to the lower ends of the cylinders 36 to 41. A valve 103 along the conduit 102 is opened by means of fluid pressure in a conduit 104 joining the valve 103 with the timer 70. This operates to release the tube from its clamping position and as above described, the carriages 5 and 6 recede to their separated original position.

The entire cycle of operation is completed in approximately 15 seconds. To recapitulate the operation, the timer 70 and the pneumatic system functions as follows: At the start of the operation, pressure is maintained in cylinders 36 to 41 to hold the clamping jaws in parted position, pressure is maintained in cylinders 49 and 50 to lock the carriages, and pressure is maintained in cylinder 9 so as to hold the carriages against the latches of cylinders 49 and 50. The operator presses a button to start the timer, and the following time cycle occurs:

| Lapsed Time in Seconds | Operation |
|---|---|
| 0 | Cylinders 36 to 41 actuate to clamp tube. Cylinder 60 advances knives. |
| 4 | Cylinder 9 is actuated to move carriages apart. Cylinders 49—50 release carriages. Cylinder 60 withdraws knives. |
| 6.5 | Cylinders 36 to 41 increase pressure. Cylinder 9 moves carriages together. |
| 13.5 | Cylinders 36 to 41 release tube. |
| 14.0 | Cylinder 9 moves carriages apart. |
| 14.5 | Cylinders 49—50 lock carriages. |
| 15.0 | Cylinder 9 moves carriages against latch. |

When the above operation is complete, the timer stops, the spliced inner tube is manually removed and the apparatus is ready for a similar cycle of operation.

Having thus described our invention, what we claim and desire to protect by Letters Patent is:

1. A machine for splicing pieces of rubber comprising, a pair of horizontally disposed carriages moveable axially toward and away from each other, means on each carriage for clamping the end portions of the rubber to be spliced, a third carriage horizontally movable at right angles to the movement of said pair of carriages, cutting means carried by the third carriage for severing a portion of the rubber extending from the clamping means to provide freshly exposed surfaces of rubber, and means for advancing the pair of carriages for moving the freshly exposed rubber surfaces into abutting engagement.

2. A machine for splicing pieces of rubber comprising, a pair of horizontally disposed carriages moveable axially toward and away from each other, clamping jaws on each carriage for holding the end portions of the rubber to be spliced, means for applying a predetermined pressure on the rubber while it is clamped, a third carriage horizontally moveable at right angles to the movement of said pair of carriages, knives carried by the third carriage for severing a portion of the rubber extending from the clamping means to provide freshly exposed surfaces of rubber, means for increasing the pressure applied to the rubber after the cutting operation and means for advancing the pair of carriages for moving the freshly exposed rubber surfaces into abutting engagement.

3. A machine for splicing pieces of rubber comprising, a pair of horizontally disposed carriages moveable axially toward and away from each other, clamping jaws on each carriage for holding the end portions of the rubber to be spliced, means for applying a predetermined pressure on the rubber while it is clamped, a third carriage horizontally moveable at right angles to the movement of said pair of carriages, knives carried by the third carriage for severing a portion of the rubber extending from the clamping means to provide freshly exposed surfaces of rubber, stationary heating elements located along the path of movement of said knives, means for maintaining the heating elements in contact with the knives during periods of rest of said knives, said knives being engageable in contact relation with said jaws for cutting the rubber stock flush with said jaws, means for increasing the pressure applied to the rubber after the cutting operation, and means for advancing the pair of carriages for moving the freshly exposed rubber surfaces into abutting engagement.

4. A machine for splicing two pieces of rubber comprising, a horizontal track, a pair of carriages moveable toward and away from each other along said track, a support on each carriage, fluid operable pressure cylinders positioned above each support, a clamping jaw associated with each cylinder for clamping the rubber stock against the supports, a second horizontal track positioned at right angles to the first named track, a pair of knives supported for movement along said second track, means for advancing the knives for severing portions of the rubber pieces extending from the supports to provide freshly exposed surfaces of rubber, means for increasing the pressure applied to the rubber after the cutting operation, and means for advancing the pair of carriages for moving the freshly exposed rubber surfaces into abutting engagement.

5. A machine for splicing pieces of rubber comprising, a horizontal track, a pair of carriages moveable toward and away from each other along said track, a support on each carriage, fluid operable cylinders positioned adjacent each support, clamping jaws associated with each cylinder for clamping the rubber stock against the supports, means including said fluid operable cylinders for applying a predetermined pressure on the rubber while it is clamped, a second horizontal track positioned at an angle to the first named track, a pair of knives supported for movement along said second track, means for advancing the knives for severing a portion of the rubber extending from the supports to provide freshly exposed surfaces of rubber, and means for advancing the pair of carriages for moving the freshly exposed rubber surfaces into abutting engagement.

6. A machine for splicing two pieces of rubber comprising, a horizontal track, a pair of carriages moveable toward and away from each other along said track, a support on each carriage, fluid operable pressure cylinders positioned above each support, a clamping jaw associated with each cylinder for clamping the rubber stock against the supports, means including said pressure cylinders for applying a predetermined pressure on the rubber while it is clamped, a second horizontal track positioned at right angles to the first named track, a pair of knives supported for movement along said second track, means for advancing the knives for severing a portion of the rubber extending from the supports to provide freshly exposed surfaces of rubber, said knives being engageable in contact relation with said jaws for cutting the rubber stock flush with said jaws, and means for advancing the pair of carriages for moving the freshly exposed rubber surfaces into abutting engagement.

7. A machine for splicing two pieces of rubber comprising, a horizontal track, a pair of carriages movable toward and away from each other along said track, a support on each carriage, fluid operable cylinders positioned adjacent each support, a clamping jaw associated with each cylinder for clamping the rubber stock against the supports, means for applying a predetermined pressure on the rubber while it is clamped, a second horizontal track positioned at right angles to the first named track, a pair of knives supported for movement along said second track, means for advancing the knives for severing a portion of the rubber extending from the supports to provide freshly exposed surfaces of rubber, said knives being engageable in contact relation with said jaws for cutting the rubber stock flush with said jaws, means for increasing the pressure applied to the rubber after the cutting operation, and means for advancing the pair of carriages for moving the freshly exposed rubber surfaces into abutting engagement.

8. A machine for splicing pieces of rubber comprising, a horizontal track, a pair of carriages movable toward and away from each other along said track, a support on each carriage, fluid operable pressure cylinders positioned adjacent each support, a clamping jaw associated with each cylinder for clamping the rubber stock against the supports, means including said pressure cylinders for applying predetermined pressures on the rubber pieces while they are clamped, a second horizontal track positioned at right angles to the first named track, a pair of knives supported for movement along said second track, means for advancing the knives for severing portions of the rubber pieces extending from the supports to provide freshly exposed surfaces of rubber, stationary heating elements located along the path of movement of said knives, means for maintaining the heating elements in contact with the knives during periods of rest of said knives, and means for advancing the pair of carriages for moving the freshly exposed rubber surfaces into abutting engagement.

9. A machine for splicing two pieces of rubber comprising, a horizontal track, a pair of carriages movable toward and away from each other along said track, a support on each carriage, fluid operable cylinders positioned above each support, a clamping jaw associated with each cylinder for clamping the rubber stock against the supports, means for applying a predetermined pressure on the rubber while it is clamped, a second horizon- tal track positioned at right angles to the first named track, a pair of knives supported for movement along said second track, means for advancing the knives for severing portions of the rubber pieces extending from the supports to provide freshly exposed surfaces of rubber, stationary heating elements located along the path of movement of said knives, means for maintaining the heating elements in contact with the knives during periods of rest of said knives, means for increasing the pressure applied to the rubber after the cutting operation, and means for advancing the pair of carriages for moving the freshly exposed rubber surfaces into abutting engagement.

10. A machine for splicing two pieces of rubber comprising, a base, a pair of carriages mounted for horizontal movement on the base toward and away from each other, clamping means carried by each carriage for holding the end portion of the rubber to be spliced, a third carriage moveable transversely of the movement of said pair of carriages, cutting means carried by said third carriage for severing a portion of the rubber extending from the clamping means to provide freshly exposed surfaces of rubber, a pair of spaced bell cranks pivotally attached at a point intermediate their ends to the base, one of said bell cranks having one end thereof pivotally and slidably attached to one of said pair of carriages, the other bell crank having one end thereof pivotally and slidably attached to the other of said pair of carriages, a fluid operable pressure cylinder having a piston rod mounted on said base, and means for pivotally and slidably attaching the other ends of said bell cranks to said piston rod whereby said pair of carriages may be simultaneously advanced to move the freshly exposed rubber surfaces into abutting engagement.

11. A machine for splicing pieces of rubber comprising, a pair of carriages mounted for movement toward and away from each other, a support on each carriage, a fluid operable pressure cylinder having a piston rod carried by each of said pair of carriages and positioned above and overlying said support, a clamping jaw attached to said piston rod for clamping the rubber stock against the support, a third carriage moveable transversely of the movement of said pair of carriages, cutting means carried by said third carriage for severing the portion of the rubber extending from the clamping means to provide freshly exposed surfaces of rubber, means for increasing the pressure supplied to the rubber after the cutting operation, and means for advancing the pair of carriages for moving the freshly exposed rubber surfaces into abutting engagement.

12. A machine for splicing pieces of rubber comprising, a base, a horizontal track mounted on said base, a pair of carriages movable toward and away from each other along said track, a support on each carriage, a fluid operable pressure cylinder having a piston rod carried by each of said pair of carriages and positioned above and overlying said support, a clamping jaw attached to said piston rod for clamping the rubber stock against the support, a second horizontal track positioned at right angles to the first named track, a pair of knives supported for movement along said second track, for severing a portion of the rubber extending from the clamping means to provide freshly exposed surfaces of rubber, a pair of spaced bell cranks pivotally attached at a point intermediate their ends to the base, one of said bell cranks having one end thereof pivotally and slidably attached to one of said pair of carriages, the other bell crank having one end thereof pivotally and slidably attached to the other of said pair of carriages, a fluid operable pressure cylinder having a piston rod mounted on said base, and means for pivotally and slidably attaching the other ends of the bell cranks to said piston rod whereby the pair of carriages may be simultaneously advanced to move the freshly exposed rubber surfaces into abutting engagement.

13. A machine for splicing pieces of rubber comprising, a base, a horizontal track mounted on the base, a pair of carriages moveable toward and away from each other along said track, a support on each carriage, a fluid operable pressure cylinder having a piston rod carried by each of said pair of carriages and positioned above and overlying said support, a clamping jaw attached to said piston rod, a second horizontal track positioned at right angles to the first named track, a pair of knives supported for movement along said second track, means for advancing the knives for severing a portion of the rubber extending from the supports to provide freshly exposed surfaces of rubber, stationary heating elements located along the path of movement of said knives, spring means for maintaining the heating elements in contact with the knives during periods of rest of said knives, a pair of spaced bell cranks pivotally attached at a point intermediate their ends to the base, one of said bell cranks having one end thereof pivotally and slidably attached to one of said pair of carriages, the other bell crank having one end thereof pivotally and slidably attached to the other of said pair of carriages, a fluid operable pressure cylinder having a piston rod mounted on said base, and means for pivotally and slidably attaching the other ends of said bell cranks to said piston rod whereby the carriages may be simultaneously advanced to move the freshly exposed rubber surfaces into abutting engagement.

14. A machine for splicing together two ends of an inner tube comprising, a pair of carriages movable toward and away from each other, clamping means on each carriage having opposed clamping surfaces for separately clamping each end portion of the inner tube in a flattened condition with a portion of the ends of the inner tube projecting beyond opposed end faces of said clamping means, a third carriage movable at substantially right angles to the movement of said pair of carriages and in a plane substantially parallel to the plane of said opposed clamping surfaces, cutting means carried by said third carriage engageable in contact relation with said opposed end faces of said clamping means for severing the projecting ends of the inner tube substantially flush with said end faces, means for increasing the pressure on said clamping means after the severing operation to bulge out the substantially flush ends beyond the said end faces of the clamping means, means for moving the pair of carriages together to abut the bulged out ends under pressure to join the same, and means for releasing said clamping means.

15. A machine for splicing together two ends of an inner tube comprising, a pair of carriages movable toward and away from each other, clamping means on each carriage having opposed clamping surfaces for separately clamping each end portion of the inner tube in a flattened condition with a portion of the ends of the inner tube projecting beyond opposed end faces of said clamping means, a third carriage movable at substantially right angles to the movement of said pair of carriages and in a plane substantially parallel to the plane of said opposed clamping surfaces, cutting means carried by said third carriage engageable in contact relation with the said end faces of the clamping means for severing the projecting ends of the inner tube substantially flush with the said faces of the clamping means, means for applying a reduced clamping pressure on said clamping means during said severing operation, means for increasing the pressure on said clamping means after the severing operation to bulge out the substantially flush ends beyond the said end faces of the clamping means, means for moving the pair of carriages together to abut the bulged out ends under pressure to join the same, and means for releasing said clamping means.

16. A machine for splicing together two ends of an inner tube comprising, a pair of carriages movable toward and away from each other, clamping means on each carriage having opposed clamping surfaces for separately clamping each end portion of the inner tube in a flattened condition with a portion of the ends of the inner tube projecting beyond opposed end faces of said clamping means, a third carriage movable at substantially right angles to the movement of said pair of carriages and in a plane substantially parallel to the plane of said opposed clamping surfaces, cutting means carried by said third carriage engageable in contact relation with the said end faces of the clamping means for severing the projecting ends of the inner tube substantially flush with the said end faces of the clamping means, means for initially actuating said clamping means to grip said end portions under high pressure, means for applying a reduced clamping pressure on said clamping means during said severing operation, means for increasing the pressure on said clamping means after the severing operation to bulge out the substantially flush ends beyond the said end faces of the clamping means, means for moving the pair of carriages together to abut the bulged out ends under pressure to join the same, and means for releasing said clamping means.

17. A machine for splicing together two ends of an inner tube comprising, a pair of carriages movable toward and away from each other, clamping means on each carriage having opposed clamping surfaces for separately clamping each end portion of the inner tube in a flattened condition with a portion of the ends of the inner tube projecting beyond opposed end faces of said clamping means, a third carriage movable at substantially right angles to the movement of said pair of carriages and in a plane substantially parallel to the plane of said opposed clamping surfaces, cutting means carried by said third carriage engageable in contact relation with said opposed end faces of said clamping means for severing the projecting ends of the inner tube substantially flush with said end faces, means for locking the pair of carriages during the cutting operation with the opposed end faces of said clamping means in alignment with said cutting means, means for increasing the pressure on said clamping means to bulge out the substantially flush ends beyond the said end faces of the clamping means, means for moving the pair of carriages together to abut the bulged out ends under pressure to join the same, and means for releasing said clamping means.

ALFRED N. IKNAYAN.
ALFRED B. CLAYTON.

REFERENCES CITED

The following references are of record in the file of this patent:

UNITED STATES PATENTS

| Number | Name | Date |
|---|---|---|
| 1,956,050 | Snyder | Apr. 24, 1934 |
| 2,027,854 | Breth | Jan. 14, 1936 |
| 2,074,485 | Nichols | Mar. 23, 1937 |
| 2,145,607 | Nichols | Jan. 31, 1939 |
| 2,273,463 | Campbell et al. | Feb. 17, 1942 |